3,690,898
METHOD OF MAKING A FILLED SANDWICH
Anthony S. Partyka, Chicago, Ill., assignor to Kraftco Corporation, New York, N.Y.
No Drawing. Filed Feb. 9, 1970, Ser. No. 9,962
Int. Cl. A21d 13/00
U.S. Cl. 99—86                                            4 Claims

ABSTRACT OF THE DISCLOSURE

A filled sandwich is provided which is suitable for heating in a vertical position without loss of filling. In preparing the sandwich, slices of bread are treated so as to provide a thin layer of hydrocolloid on at least one surface of each slice of bread. Thereafter, a sandwich filling is applied to the treated surface of at least one of the bread slices and the bread slices are formed into a filled sandwich. The hydrocolloid seals the sandwich and prevents loss of filling when the sandwich is heated in a vertical position.

---

The present invention relates generally to a snack food product and more particularly relates to a snack food product of the sandwich variety which may be heated in a vertical position without loss of filling and may be heated from a frozen condition without excessive browning of the exterior surface of the sandwich.

Convenience food products are a rapidly expanding segment of the food industry. In this connection, numerous convenience foods have been developed which may be readily heated directly by the consumer by inserting the food product into a heating device, such as a household toaster. It would be desirable to develop a filled sandwich type convenience food which can be heated in a vertical position by means of a household toaster. However, there are numerous problems in connection with heating a filled sandwich type food product in a vertical position. For example, the filling of the sandwich must not be permitted to escape from the sandwich into the mechanism of the heating device.

Accordingly, it is the principal object of the present invention to provide an improved filled sandwich and a method of making same. It is another object of the present invention to provide a filled sandwich type food product which may be heated in a vertical position and a method for making same.

These and other objects of the invention will become more apparent from the following detailed description.

In general, in a method embodying various features of the invention, a filled sandwich is provided which is suitable for heating in a vertical position without loss of filling. In preparing the sandwich, slices of bread are treated so as to provide a thin layer of a hydrocolloid on at least one surface of each slice of bread. Thereafter, a layer of sandwich filling is applied to the treated surface of at least one of the bread slices. The treated sides of the bread slices are then placed in face-to-face contact so as to form a sandwich.

It is anticipated that the novel sandwich of the invention will find its greatest use in providing sandwiches which may be directly heated from a frozen condition in a household toaster. For such applications, the bread slices should be sufficiently thin so that at least two bread slices can be used along with a suitable amount of filling and still provide a sandwich thin enough to insert in the slot of a conventional household toaster. For such applications, the bread slices should be no greater than about ¼ inch thick. In general, the term "bread" as used herein refers to any of the commercially available loaf or roll type bread products.

It is preferred that the hydrocolloid be a dry, edible hydrocolloid which will readily hydrate in situ by absorption of moisture from the bread or a sandwich filling applied thereto. After hydration the hydrocolloid forms a substantially continuous adhesive film that acts to cause the sandwich filling to adhere to the bread slices and permits heating without loss of filling. Suitable hydrocolloids include pre-gelatinized starch, carboxymethylcellulose, propylene glycol alginate and sodium alginate. The hydrocolloid may be applied in a dry form or a slurry of the hydrocolloid may be used. Particularly preferred hydrocolloids are pre-gelatinized starches, such as cornstarch, potato starch or the like. For reasons of economy and availability, it is particularly preferred to use a pre-gelatinized cornstarch. The hydrocolloid may be applied to the surface of the bread slice by any suitable means, such as by dusting the hydrocolloid onto the surface of the bread slice.

Hydrated slurries of hydrocolloids which do not readily hydrate may also be used. Such hydrocolloids include unmodified starch, carrageenan, guar gum, carob gum, gum tragacanth and gelatin. Hydrated slurries may be prepared by forming a dispersion of the hydrocolloid in a suitable fluid, such as water, and thereafter heating the dispersion to a temperature sufficient to gelatinize the hydrocolloid. When hydrated slurries of hydrocolloid are used the level of hydrocolloid should be as high as possible and should be above about 5 percent by weight. All percentages used herein are by weight unless otherwise specified.

In general, levels of hydrocolloid in the slurry of from about 7 percent to about 20 percent are suitable. The hydrocolloid slurry may contain a vegetable or animal fat to aid in spreading the slurry onto the bread slice. The level of fat, however, should not be above about 30 percent to prevent lessening the adhesive capacity of the hydrated hydrocolloid slurry.

The hydrocolloid, after being hydrated, acts to cause the sandwich filling to adhere to the bread slice so that the assembled sandwich may be heated in a vertical position without loss of filling. The hydrocolloid also lessens the tendency of the sandwich to curl. Such curling is undesirable in that it may inhibit withdrawal of the sandwich from the toaster. The hydrocolloid is added to the bread slice at a level sufficient to provide the desired amount of adherence of the sandwich filling to the bread slice. In general, a level of hydrocolloid of from about .01 gram to about .04 gram per square inch of bread slice is sufficient to provide the desired adherence. Levels of hydrocolloid up to about .05 gram per square inch of bread slice may be used. Higher levels of hydrocolloid may also be used, but no additional advantage is attained therefrom.

After the hydrocolloid is applied to the surface of the bread slice, a sandwich filling is added to the surface of the bread slice which has been treated with the hydrocolloid. Any suitable sandwich filling may be used. It is preferred to use sandwich fillings which have some appreciable level of moisture therein so as to aid in the hydration of the hydrocolloid. For example, such sandwich fillings as ham salad, chicken salad or the like are particularly preferred.

After the sandwich filling has been applied to the treated surface of one slice of bread, the sandwich may be assembled by placing the treated surface of a second slice of bread in face-to-face relation with the first slice of bread with the sandwich filling located between the two slices of bread. It is preferred that the filling be applied so as to not completely cover the bread slice. In such case the periphery of the bread slices come into contact and form a peripheral seal around the filling. It should be understood that the method of the invention is also applicable to sandwiches containing more than two slices of bread. For such application, intermediate slices of bread would be treated by applying a layer of hydrocolloid onto both surfaces of the intermediate bread slice.

After the sandwich is assembled, the sandwich may be treated by any suitable means to effect partial cooking of the sandwich and partial browning of the exterior surface of the sandwich. Such heating aids in hydrating dry bread slices by causing moisture in the bread slice to form steam. Such heating is, however, optional and is usually performed only on those types of sandwiches which are traditionally served in a cooked condition. A preferred method of effecting heating is to grill the sandwich on both sides after applying a light coating of a suitable edible fat to the surface of the sandwich. Suitable edible fats include butter, margarine, salad oil, shortening or the like. After the sandwich has been heated to effect cooking and browning of the exterior surface, the sandwich may be frozen and stored. No particular precautions are required for freezing the sandwich, but the temperature of the sandwich should be reduced to at least below about 25° F.

The following example further illustrates various features of the invention, but is intended to in no way limit the scope of the invention, which is defined in the appended claims.

EXAMPLE

A sandwich is prepared in accordancce with the invention. Slices of rye bread, which are ¼ inch thick, are treated so as to apply a thin layer of pre-gelatinized cornstarch thereto. The cornstarch is dusted onto one surface of each bread slice so as to provide .025 gram of cornstarch per square inch of surface of the bread slice. A sandwich filling having the following composition is then applied to the treated side of one slice of bread:

| Ingredients: | Weight percent |
|---|---|
| Peanut butter | 65 |
| Apple jelly | 35 |

The sandwich is then assembled by placing a second slice of bread with a treated surface onto the sandwich filling which has been applied to the first slice of bread. Thereafter, margarine is sprayed onto the exterior surface of both sides of the sandwich and the sandwiches are grilled so as to effect even browning thereof.

The sandwiches are then frozen in a freezer having a constant temperature of −15° F. The sandwiches are permitted to come to temperature equilibrium in the freezer and are then removed therefrom.

The sandwiches are then directly heated in a household toaster. The toaster is adjusted to permit heating to occur for four minutes. After heating, the sandwich is warmed throughout and no additional browning of the sandwich has occurred. No loss of sandwich filling is observed during heating of the sandwich.

What is claimed is:

1. A method for providing a filled sandwich suitable for heating in a vertical position without loss of filling, which comprises treating slices of bread so as to provide a thin layer of a substantially dry, readily hydrated hydrocolloid on at least the peripheral portion of one surface thereof, applying a layer of sandwich filling on the treated surface of at least one of said slices of bread, and placing the treated sides of at least two of said bread slices in face-to-face relation so as to form a filled sandwich with said filling interposed between the treated sides of said bread slices, said readily hydrated hydrocolloid being hydrated in situ by moisture absorption from said filling or said bread so as to provide a filled sandwich which may be heated in a vertical position without loss of filling.

2. A method in accordance with claim 1 wherein said hydrocolloid is selected from starch, carboxymethyl cellulose, propylene glycol alginate, sodium alginate, carrageenan, guar gum, carob gum, gum tragacanth and gelatin.

3. A method in accordance with claim 1 wherein said hydrocolloid is a pre-gelatinized starch.

4. A method in accordance with claim 1 wherein said hydrocolloid is added to said bread slice at a level of from about .01 to .04 gram per square inch.

References Cited

UNITED STATES PATENTS

| 2,060,490 | 11/1936 | Borbèly | 99—86 |
| 1,942,423 | 1/1934 | Henry | 99—86 |
| 3,527,646 | 9/1970 | Scheick et al. | 99—166 |
| 3,083,651 | 4/1963 | Cooper | 99—86 X |

OTHER REFERENCES

Whistler: "Industrial Gums," 1959, Academic Press, New York, TP 978 W5 C. 4, pp. 328, 645, 647.

RAYMOND N. JONES, Primary Examiner